UNITED STATES PATENT OFFICE.

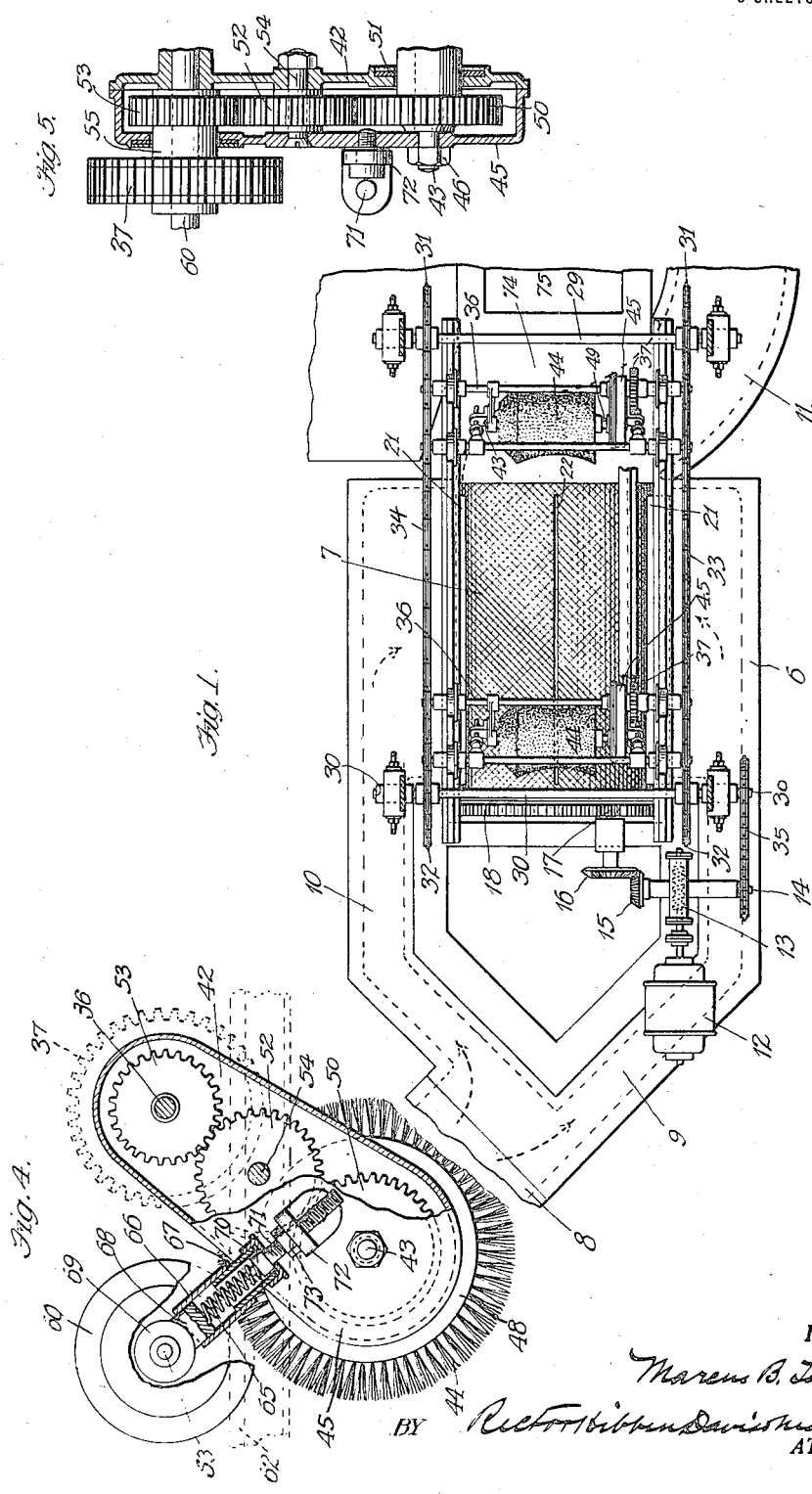

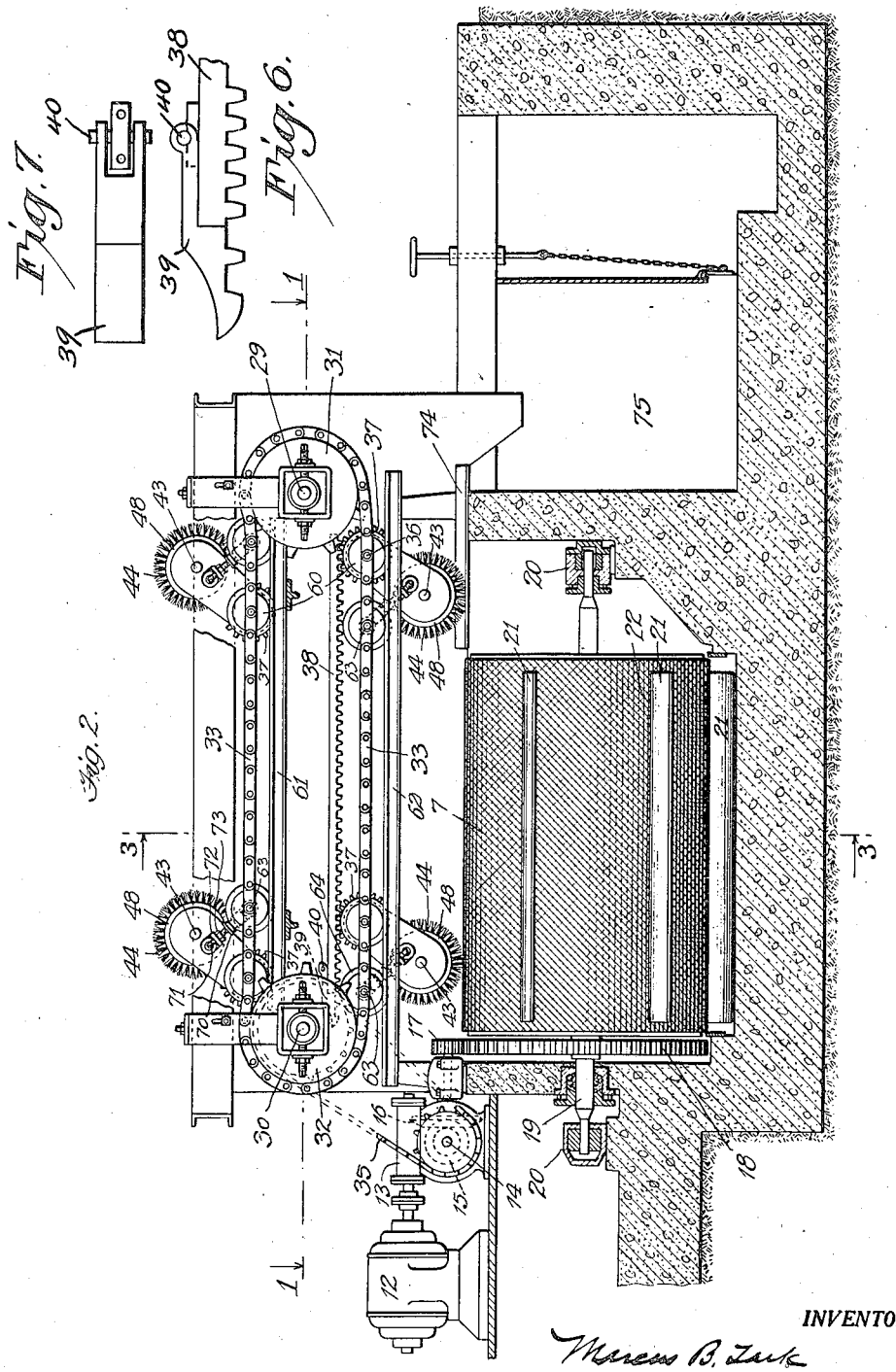

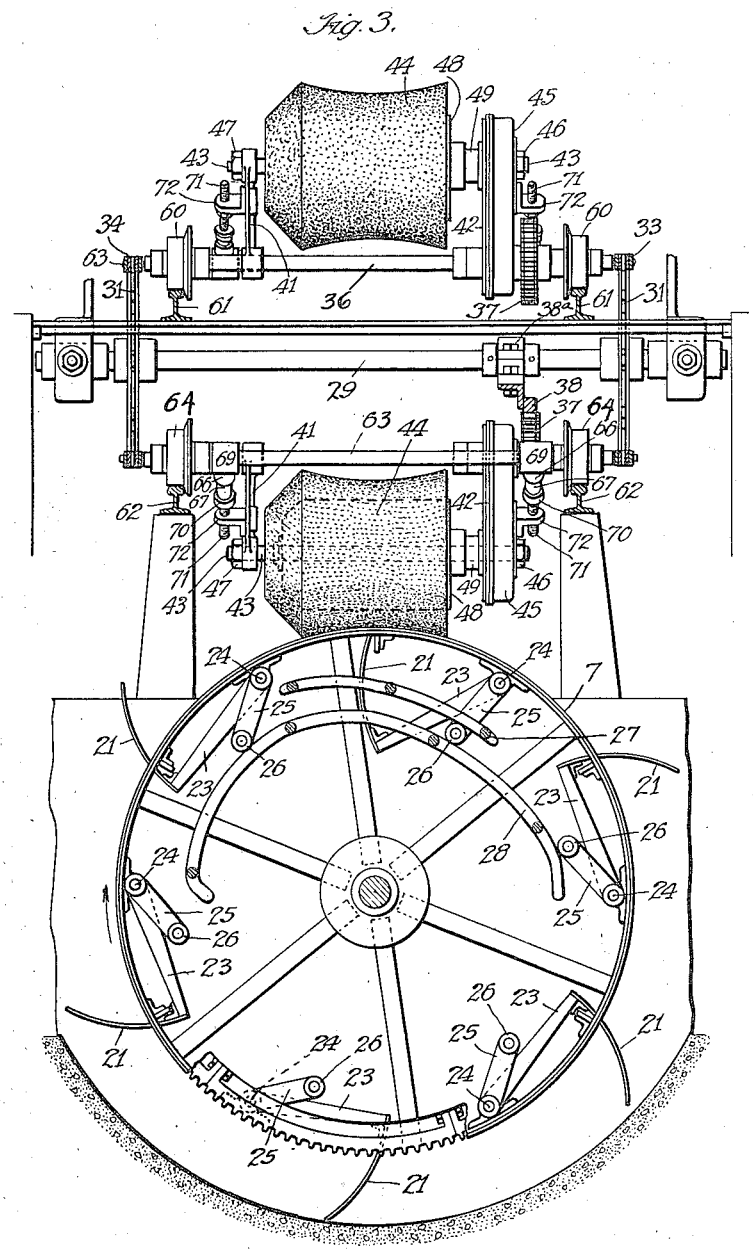

MARCUS B. TARK, OF PHILADELPHIA, PENNSYLVANIA, ASSIGNOR TO PACIFIC FLUSH TANK COMPANY, OF CHICAGO, ILLINOIS, A CORPORATION OF ILLINOIS.

FILTRATION APPARATUS.

1,418,687.  Specification of Letters Patent.  Patented June 6, 1922.

Carved out of application Serial No. 77,978, filed February 12, 1916, on which Patent No. 1,188,340 was granted June 20, 1916, and filed after grant of the patent. This application filed June 19, 1918. Serial No. 240,780.

*To all whom it may concern:*

Be it known that I, MARCUS B. TARK, a citizen of Switzerland, residing at Philadelphia, in the county of Philadelphia and State of Pennsylvania, have invented certain new and useful Improvements in Filtration Apparatus, of which the following is a specification.

My invention relates more particularly to the cleaning apparatus used in combination with the filtration apparatus such as is disclosed in Patent No. 1,188,340, granted to me June 20, 1916, and from which application certain claims were divided and are now presented in this case. In certain of its features it is also applicable to other forms of cleaning and filtration apparatus as will be seen from the following detailed description. The filtration apparatus disclosed in my said patent is more particularly designed for the treatment of sewage and comprises a traveling screen which is interposed in a channel or conduit into which the sewage flows, in such a way that the liquid portions of the sewage flow through the screen but the solid matters are retained thereby. The liquid is conveyed away through a suitable channel or conduit but the intercepted solid matter is raised or carried by the moving screen above the liquid level and then removed from the screen and transferred to a suitable carrier. The present invention relates more specifically to means for removing solid matters from the screen and comprises traveling rotary brushes which are caused to traverse the screen surface and at the same time to rotate it to thoroughly brush the screen. In my said patent is shown but not claimed a cleaning device of this general construction. In the present application I have shown the device as applied only to a cylindrical rotary screen, but the device is equally applicable to other forms of screen, and in the aforesaid patent the screen device is shown as applied also to an endless band screen to which obviously the present improvement is applicable.

While I have shown in the accompanying drawings and described in the following specification a preferred form of apparatus for practicing my invention, it is to be understood that the specific disclosure is for the purpose of exemplification only and that the scope of the invention is defined in the following claims in which I have endeavored to distinguish it from the prior art so far as known to me without, however, relinquishing or abandoning any portion or feature thereof.

In the accompanying drawings in which each part is identified by the same reference character throughout, Fig. 1 is a plan view of a filtering system embodying my invention, Fig. 2 a side elevation, partly in vertical section, of the same construction; Fig. 3 a vertical section on the line $3^3$ of Fig. 2, Fig. 4 a side elevation of a detail partly in vertical section; Fig. 5 a section at right angles thereto; Figure 6 is an elevation, on a larger scale, of the latch 39 shown in Figure 5; and Figure 7 is a plan of said latch.

The general plan of a filtering system such as that to which my invention is here applied is shown in Fig. 2 of my said patent, the specific system there shown being double, that is to say, comprising two complete filters, although that is not essential. In the drawing of this case I have shown one of the complete filtering units, comprising a concrete or masonry tank 6 in which is mounted a revolving cylindrical screen 7. The screen is mounted longitudinally of the tank and the conduit 8 which leads the sewage to the tank is divided into branches 9, 10 which lead the sewage to opposite sides of the revolving screen, see dotted lines in Fig. 1. The tank is provided with an outlet conduit 11 which communicates only with the interior of the screen, it being understood that the walls of the tank fit about the rotating screen so closely that substantially all the liquid is forced to pass through the screen and all of the solid matter is intercepted thereby.

Any suitable means may be employed for rotating the screen, and I have shown for this purpose an electric motor 12 which drives a worm 13, the latter engaging a worm wheel on shaft 14. The last named element carries also a bevel pinion 15 meshing with a bevel pinion 16 on a horizontal shaft which also carries a gear 17 meshing with a circular rack 18 upon the screen for driving the latter. The rack is mounted upon the shaft 19 of the screen which is mounted in suitable bearings 20.

As the screen revolves it picks up the solid matter arrested thereby, a large portion of which is frictionally held upon the screen while being revolved. The screen is provided, however, with blades 21 which are movable in and out through transverse slots 22 in the screen which blades are projected when below the level of the tank for the purpose of collecting and carrying up solid matter with which they come in contact. For the purpose of controlling the movement of the blades they are mounted upon arms 23 pivoted at 24 to the framework of the screen. Operating arms 25 are secured to arms 23 and provided with rollers 26 which engage stationary cams 27, 28 so formed as to project the blades as they enter the tank and withdraw the blades as they approach the brush or cleaning apparatus hereinafter described. These blades and the means for operating them may be and are shown as constructed in the same manner as those of the apparatus illustrated in my patent referred to above. It will be seen therefore that the rotating filter or screen collects upon its surface the solid matter contained in the sewage and carries it upward during its revolution.

Preferably at the highest point of travel of the screen surface is arranged the device for cleaning the screen which forms the subject matter of the present application and which I will now describe. A pair of shafts 29, 30 are journaled in suitable supports above the rotating screen and each such shaft has mounted thereon a pair of sprockets 31, 32, endless chains 33, 34 being mounted on the sprockets for a purpose which will appear. The shafts carrying the sprockets may be driven in any suitabe manner, but I have shown for this purpose a sprocket chain 35 connecting a sprocket upon shaft 30 with a sprocket upon shaft 14, which is heretofore described as driven by the motor 12. At suitable intervals, depending upon the number of brushes which it is desired to employ, shafts 36 are secured to the sprocket chain, there being four of said shafts in the particular construction illustrated. Each shaft 36 is provided near one end thereof with a hanger 41 and near the other end with a hanger casting 42, said hanger and casting supporting between them a shaft 43 upon which the brush 44 is journaled. A cover plate 45 cooperates with the hanger casting 42 to form a housing for gearing to be presently described for driving the brush, and said shaft 43 extends through the cover plate and is provided at its ends with nuts 46, 47 by which it is secured in place in said cover plate and hanger respectively. The body 48 of the brush is provided with a sleeve end portion 49 which extends through the hanger casting 42 and is provided inside the housing with a pinion 50 for driving said brush. The housing is packed at 51 to prevent entrance of foreign matter thereto. An idler pinion 52 is in mesh with pinion 50 to drive the same and is driven from a pinion 53 loosely mounted upon shaft 36. The idler 52 is journaled on a stud 54 secured to the hanger casting. A sleeve 55 connects gear 53 with a gear 37 outside the housing, and the last said gear engages stationary rack 38 when the brush unit is carried in one direction by the movement of the sprocket chains whereby through the gearing above described the brush is given a suitable rotation for cleaning the screen. It will be noted that the brush 44 engages with the blades 21 as they are being withdrawn upon reaching the top of the screen, and that the brush surface thus engaging with the blade is formed obliquely with the line of its axis and path of travel.

The rack 38 is suspended from shafts 29 and 30 by hangers 38ª and at its left-hand end as seen in Fig. 2 is provided with a pivoted end section or latch 39 pivoted at 40 to permit it to rise somewhat as the pinions are carried by the chains about the sprocket 32. Said latch is a hinged continuation of the rack, every other tooth being omitted. The pinion 37, or a cam attached thereto, lifts the latch slightly, and the end tooth of the latch drops into the pinion, guided by the curved end of the latch.

Upon the ends of shaft 36 are journaled wheels or rollers 60, which during the travel of the chain run upon upper and lower rails 61, 62, which thereby support the brush units.

In order to nicely adjust the position of the brushes with respect to the screen the hanger and hanger casting are of such length as to be inclined at a substantial angle when the brushes are in contact with the screen and this angle may be adjusted by means of the connection of each casting with a shaft 63 which is likewise mounted on wheels 64 bearing upon said tracks. Preferably shafts 63 are connected to the respective sprocket chains at their opposite ends. The adjustable connection between the housing and the last mentioned shaft comprises a telescopic member secured to said shaft and housing respectively, a spring 65 being enclosed in a pair of telescopic tubular members 66, 67, the former of which is connected by a head 68 and eye 69 to the shaft 63. The tubular member 67 is provided with a cap 70 secured to bolt 71 which passes through a bracket 72 and is adjustable relatively thereto by a nut 73. Obviously by adjusting the nut 73 the pressure of the brush on the screen can be regulated.

A chute 74 is arranged in the path of movement in the brushes so that the solid matter removed from the screen is carried by the brushes along said chute from which it is deposited in a tank 75 arranged for the purpose whence it may be removed by any suitable or approved means.

The operation of the machine has been substantially described in connection with its construction. It will be understood that all the parts are constantly actuated while the device is in use, the screen constantly rotating and presenting to the cleaning mechanism surfaces laden with solid matter. The brushes are arranged sufficiently closely together and operated at such a speed that the surface operated upon by each overlaps that operated upon by the preceding and succeeding brushes, each sweeping across the screen brushing the solid matter ahead of it, the rotation of the brush being in the direction opposite to that of its travel.

I claim:

1. In a device of the class described, an endless carrier, a series of brushes attached to the carrier, inclined arms supporting each brush, said arms being adapted to swing with relation to the carrier and adjustable links connected to said arms and to the endless carrier for adjusting the arms with respect to the latter.

2. In a device of the class described, an endless carrier, a series of brushes attached to the carrier, inclined arms supporting each brush, said arms being adapted to swing with relation to the carrier and means connected to said arms and to the endless carrier for adjusting the arms with respect to the latter.

3. In a device of the class described, a pair of endless chains, shafts connecting the chains, brushes connected to the respective shafts, a pair of arms by which each brush is suspended from its shaft, and means to adjust the angle of inclination of the arms.

4. In a device of the class described, an endless carrier, tracks parallel to said endless carrier, rotary brushes traveling with said carrier, arms connecting each brush with the carrier, a rack parallel to said tracks, a pinion for each brush adapted to engage said rack to rotate the brush, gearing intermediate said pinion and brush, a pair of wheels for each brush on said tracks connected to the arms for supporting the brushes, a second pair of wheels for each brush on the tracks, a shaft connecting said second pair of wheels, and adjustable links intermediate said shaft and the arms for supporting the brush.

5. A travelling cleaning device including a plurality of pivotally mounted wheel members, supports for said wheel members, a flexible endless connection mounted to travel over said wheel members, a rotatable axially mounted toothed member permanently secured to and carried by said endless connection, a rotatably mounted cleaning member driven by said toothed member, said cleaning member being mounted to swing about said toothed member as an axis, and means for actuating said toothed member to drive said cleaning member.

6. A travelling cleaning device including a plurality of pivotaly mounted wheel members, supports for said wheel members, a flexible endless connection mounted to travel over said wheel members, a rotatable axially mounted toothed member permanently secured to and carried by said endless connection, a rotatably mounted cleaning member driven by said toothed member, said cleaning member being mounted to swing about said toothed member as an axis, and means for actuating said toothed member to drive said cleaning member, comprising a toothed rack bar to engage with said toothed member to actuate the same and said cleaning member.

7. In a device of the character described, an endless conveyor, a rotatable brush carried thereby, a gear operatively associated with said brush, a stationary rack positioned in a portion of the path of said gear so as to engage the gear and mesh therewith, and an element pivoted to that end of said rack which first engages with the gear, said element having a curved end and a gear tooth thereon, adapted to assist in causing the gear to mesh correctly with the rack.

8. In a device of the character described, an endless conveyor, a rotatable brush carried thereby, a gear operatively associated with said brush, a stationary rack positioned in a portion of the path of said gear so as to engage the gear and mesh therewith, and an element yieldingly mounted at that end of said rack which first engages with the gear and having a projection thereon adapted to engage the gear and thus assist in causing the gear to mesh correctly with the rack.

MARCUS B. TARK.